Jan. 13, 1942.  B. E. SHAW  2,269,864
SAFETY CONTROL
Filed Oct. 16, 1939
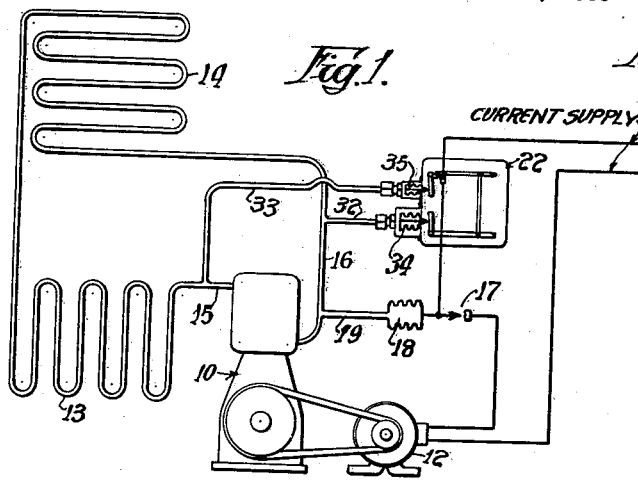
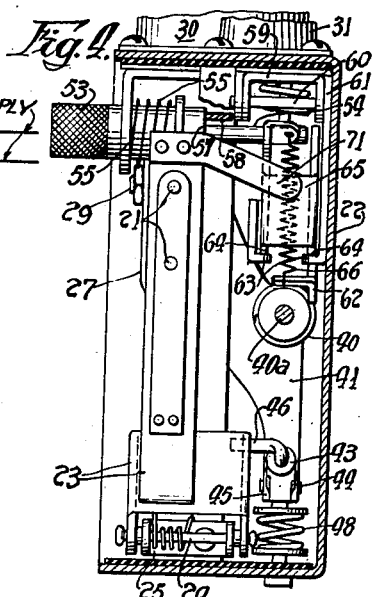
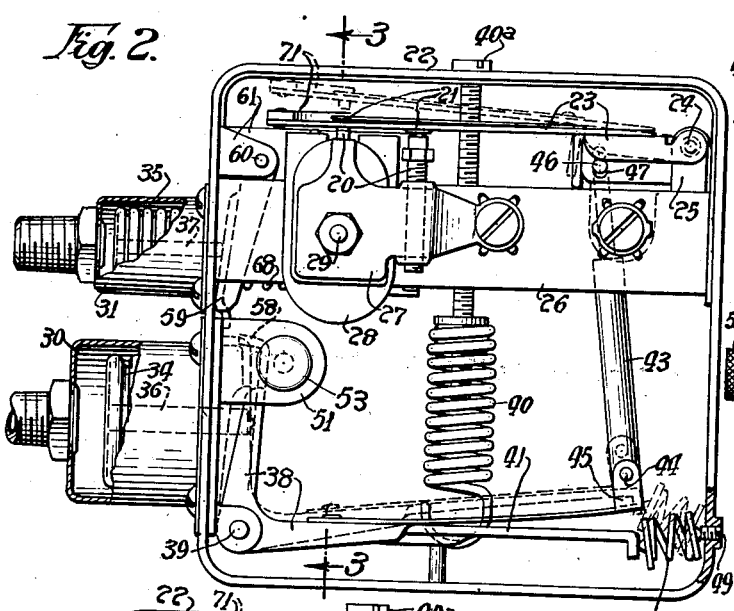
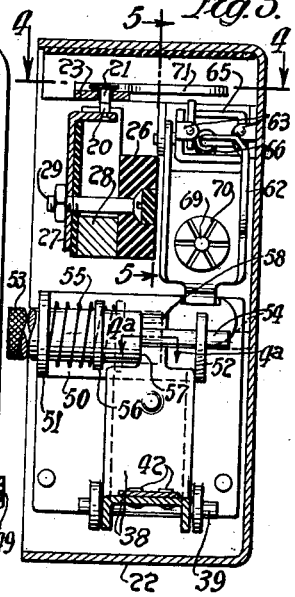
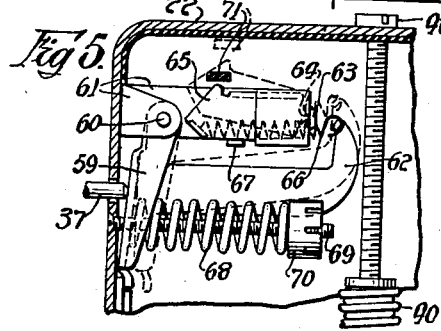
Inventor:
Burton E. Shaw,
By Bair & Freeman
Attorneys Patented Jan. 13, 1942

2,269,864

UNITED STATES PATENT OFFICE 2,269,864

SAFETY CONTROL

Burton E. Shaw, Bristol, Ind., assignor to Penn Electric Switch Co., Goshen, Ind., a corporation of Iowa Application October 16, 1939, Serial No. 299,765

4 Claims. (Cl. 62—4)

My present invention relates to a safety control for refrigerant compressors particularly of the electric motor driven type, the control including switch mechanism in the circuit of the motor.

One object of the invention is to provide a comparatively inexpensive control device which can be readily installed in a refrigerant system in such manner that the refrigerant compressor motor can operate in response to any of the usual types of automatic control devices, but in the event of either an excessively low, low-side pressure or an excessively high, high-side pressure, my safety switch will open and thereby prevent undesired operation.

A further object is to provide a safety control which guards against undesirable operation of the refrigerating mechanism in the event of loss of refrigerant or reduction of low-side pressure to less than that desired in the system, the safety control automatically locking out in such event and thus requiring a service call and the consequent proper attendance to the abnormal condition that caused the safety control to operate.

Another object is to provide a high-side safety control which can operate on the same switch and which is effective to open the switch in the event of an excessively high pressure in the high-side line, but to permit it to close again if the pressure reduces to a predetermined point.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a diagrammatic view of a refrigerant system with my safety control installed therein;

Figure 2 is a front elevation of the safety control with the cover of the housing removed to show interior details and with portions of bellows housings broken away to further illustrate details of construction;

Figure 3 is a sectional view on the line 3—3 of Figure 2;

Figure 4 is a sectional view on the line 4—4 of Figure 3, with a portion of the figure on the section line 4a—4a of Figure 3, and Figure 5 is a sectional view on the line 5—5 of Figure 3.

On the accompanying drawing I have used the reference numeral 10 to indicate a refrigerant compressor and 12 a motor therefor. The refrigerant system includes the compressor 10, a condenser 13 and a low-side pipe 16 extends from the evaporator 14 to the compressor 10.

For normal automatic control of the refrigerant system, I illustrate a conventional low-side switch 17 having a pressure responsive bellows 18 connected by a pipe 19 to the pipe 16.

My safety switch includes stationary contacts 20 and movable contacts 21 in series with the switch 17 and the motor 12. Contacts 21 are normally closed against the contacts 20 and the entire contact structure is mounted in a housing 22.

The movable contacts 21 are carried by a switch arm 23 pivoted at 24 on a bracket 25 which, in turn, is mounted on the supporting bar 26. The stationary contacts 20 are carried by a bracket 27 which also serves to retain a permanent horseshoe magnet 28 in position on the supporting bar 26. The bracket and magnet are retained on the bar by a bolt 29.

A pair of bellows housings 30 and 31 are mounted on the housing 22. They are connected with the low-side and high-side lines 16 and 15, respectively, by pipes 32 and 33. Within the housings 30 and 31 are bellows 34 and 35. The heads of the bellows are provided with actuating pins 36 and 37.

The actuating pin 36 bears against a bell crank lever 38 pivoted at 39 in the housing 22. The bell crank lever is urged against the actuating pin 36 by adjustable range spring 40.

A leaf spring 41 is secured as at 42 to the bell crank lever 38 and is connected by a link 43 to the switch arm 23. The lower end of this connection consists of a pivot pin 44 in an end 45 of the leaf spring 41. The upper end of the link 43, indicated at 46, travels in a slot 47 of the switch arm 23.

A toggle spring 48 is interposed between an adjustable set screw 49 and one end of the bell crank 38. The toggle spring widens the differential of operation of the switch arm 23 relative to the low side pressure responsive bellows 34 to a substantial degree.

A bracket 50 having perforated ears 51 and 52 is supported in the housing 22. Slidably mounted in the ears is a lock pin 53 having a reduced part 54. A spring 55 is interposed between the ear 51 and a flange 56 on the lock pin 53 to urge the pin inwardly relative to the housing 22. The transition from the reduced portion 54 to the enlarged part of the lock pin 53 results in a shoulder 57 (see Figures 3 and 4) adjacent a reduced extension 58 of the bell crank 36 for a purpose which will hereinafter appear when I describe the operation of my safety control.

The actuating pin 37 of the high side bellows 35 engages a lever 59 pivoted at 60 to a bracket 61. The bracket 61 is supported in the housing 22 and the lever 59 has a hooklike extension 62.

The bracket 61 is provided with a pair of ears 63 containing depressions in which pointed ends 64 of a toggle lever 65 are seated. A toggle spring 66 connects the lever 65 with the extension 62 in such manner that the spring is normally below center and the toggle lever 65 down against a stop 67 of the bracket 61.

A spring 68 opposes the bellows 35 and is mounted on a bolt 69. A nut 70 on the bolt serves for adjusting the tension of the spring. When the pressure of the bellows 35 is sufficient to overcome the tension of the spring 68, the extension 62 is moved upwardly so that the toggle spring 66 passes above center and snaps the toggle lever 65 up against an arm 71 extending from the switch lever 63. This opens the switch, the leaf spring 41 permitting switch arm 23 to move upwardly while the bell crank lever 38 remains in normal position, as shown by solid lines in Figure 2.

*Practical operation*

In the operation of my safety control, the parts normally assume the position shown by solid lines in Figure 2. In order to be in this position there must be sufficient pressure in the low side pipe 16 and consequently in the pipe 32 and the bellows housing 30 to hold the bell crank 38 in the solid line position. The pressure in the high side pipe 15 and consequently the pipe 33 and the bellows housing 31 must be insufficient to overcome the tension of the spring 68, so that the toggle lever 65 remains in the lowered solid position of Figure 5.

If there is a loss of refrigerant in the refrigerant system, as from a leak or any other cause, when such loss becomes excessively low the bell crank 38 will move toward the dotted position until the toggle spring 48 passes center, and will thereupon quickly move to the dotted position, thus opening the safety switch and de-energizing the refrigerant compressor motor 12. When the dotted position is reached, the shoulder 57 of the lock pin 53 will be forced by the spring 55 behind or to the right (as viewed in Figure 2) of the extension 58 of the bell crank lever 38. The pressure at which the bellows 44 causes the switch to open may be set as desired by an adjusting screw 40a for the range spring 40.

Since the switch is now locked out, if the condition that caused an excessively low pressure for any reason builds up again, the switch will not be brought back to closed position because it is desirable that whatever caused the excessively low-side pressure be remedied. Therefore a service call must be made and the trouble remedied, before the safety control is returned to operative position. In case of loss of refrigerant, due to leakage, the point of leakage must be repaired and new refrigerant inserted in the system and the pressure brought up to a proper value which will cause pressure on the low-side bellows 44 and the actuating pin 36. By then pulling outwardly on the lock pin 53, the reduced portion 54 of the pin will be brought into registry with the extension 58 and the switch will be snapped by the spring 40 to closed position. Thereafter the low-side portion of the safety control will operate in the manner already described to cause the refrigerant system to stop operating in case of an excessively low pressure in the low-side line.

In case an excessively high pressure develops in the high-side line 15, the parts will be thrown to the dotted position of Figure 5, whereupon the switch is opened as already described. This pressure can be set as desired by changing the tension of the spring 68.

When the high-side pressure recedes to a point somewhere below that at which the toggle lever 65 snapped to switch opening position, the toggle lever will return to the full line position of Figure 5 and thus permit the switch to close. The pressure at which the switch will close will be somewhat lower than the pressure at which it opened, due to the differential of the toggle mechanism, thus insuring that the pressure is down to normal before closure is permitted. Upon opening, however, the pressure builds up to a somewhat higher degree than normal before it is able to overcome the differential of the toggle mechanism and cause it to spring to switch opening position.

I have provided a safety control in which safety for excessively low pressure in the low-side line is effected and then the switch locked in open position. The safety mechanism for the high-side line recycles in case the pressure drops again to normal. Accordingly service calls are required only for the contingency of loss of pressure in the low-side line, whereas conditions causing excessively high pressures in the high-side line are not serious, provided the compressor motor is shut off in the event of an excessively high pressure. Such high pressures always recede after the compressor is shut off and therefore lock-out need not be provided for the high-side mechanism.

In accordance with the provisions of the patent statutes, I have described the principle of operation of my invention together with an illustration of a safety control which I consider to represent the best embodiments thereof, but I desire to have it understood that the structure disclosed is only illustrative and that the invention may be carried out by other means within the scope of the appended claims.

What I claim as new and desire to secure by Letters Patent of the United States is:

1. In a safety control, a switch housing, a switch therein, said switch being connected in the circuit of a refrigerant compressor motor, means responsive to the low side pressure of refrigerant in the refrigerant system and connected with said switch to effect closing thereof during normal low side pressure affecting said means, the connection between said means and said switch including a toggle spring and magnet and armature means to provide a substantially wide differential of operation of said switch in response to said means, lock means to retain said switch in open position upon assuming such position as a result of excessive low side pressure, said lock means being manually operable to non-retaining position to permit the switch to return to normal position, a second means responsive to the high side pressure of the refrigerant in the refrigerant system, toggle mechanism in said housing and connected with and positioned by said second means in inoperative position during normal pressure in the high side, said toggle mechanism being movable to an operative position by said second means when the high side pressure becomes excessive, said toggle mechanism in said operative position engaging said switch to effect opening thereof and upon recession of the high side pressure to a predetermined point below the pressure at which it was operated to effect opening of said switch, moving to inoperative position to permit the switch to return to closed position and thereupon function in its normal control capacity.

2. In a safety control, a switch connected in the circuit of a refrigerant compressor motor, means responsive to the low side pressure of refrigerant in the refrigerant system and connected with said switch to effect closing thereof during normal low side pressure affecting said means, lock means to retain said switch in open position upon assuming such position by reason of said low side pressure reducing to less than normal, said lock means being manually operable to non-retaining position to permit the switch to return to normal position, a second means responsive to the high side pressure of the refrigerant in the refrigerant system, toggle mechanism connected therewith and positioned thereby in inoperative position during normal pressure in the high side, said toggle mechanism being movable to an operative position by said second means when the high side pressure becomes excessive and thereupon effecting opening of said switch and upon recession of the high side pressure to a predetermined point, moving to position permitting the switch to return to closed position.

3. A safety control comprising a switch connected in the circuit of a refrigerant compressor motor, means responsive to the low side pressure of refrigerant in the refrigerant system and connected with said switch to effect closing thereof during normal low side pressure affecting said means and to effect opening thereof upon reduction of said pressure to below normal, lock means to retain said switch in open position upon assuming such position, and a second means responsive to the high side pressure of the refrigerant in the refrigerant system to effect opening of said switch upon excessive high pressure and, upon recession of the high side pressure to normal, effecting return of said switch to closed circuit position.

4. In a control structure of the character disclosed, control mechanism for a refrigerant compressor, means responsive to the low side pressure of refrigerant in the refrigerant system and connected with said control mechanism to effect operation of said refrigerant compressor during normal low side pressure affecting said means, a toggle spring acting on said means to provide a substantially wide differential of operation of the control mechanism in response to said means, lock means to retain said control mechanism in operative position upon assuming such position as a result of excessive low side pressure developing, said lock means being manually operable to non-retaining position to permit said control mechanism to return to normal operative position, a second means responsive to the high side pressure of the refrigerant in the refrigerant system, toggle mechanism connected therewith and positioned thereby in an inoperative position during normal pressure in the high side, said toggle mechanism being movable to operative position by said second means when the high side pressure becomes excessive, said toggle mechanism in said operative position rendering said control mechanism inoperative and, upon recession of the high side pressure to a predetermined point, returning to inoperative position to permit the control mechanism to return to operative position.

BURTON E. SHAW.